Aug. 6, 1940.  B. L. QUARNSTROM  2,210,338
METHOD OF MAKING TUBES
Filed July 30, 1938  2 Sheets-Sheet 1
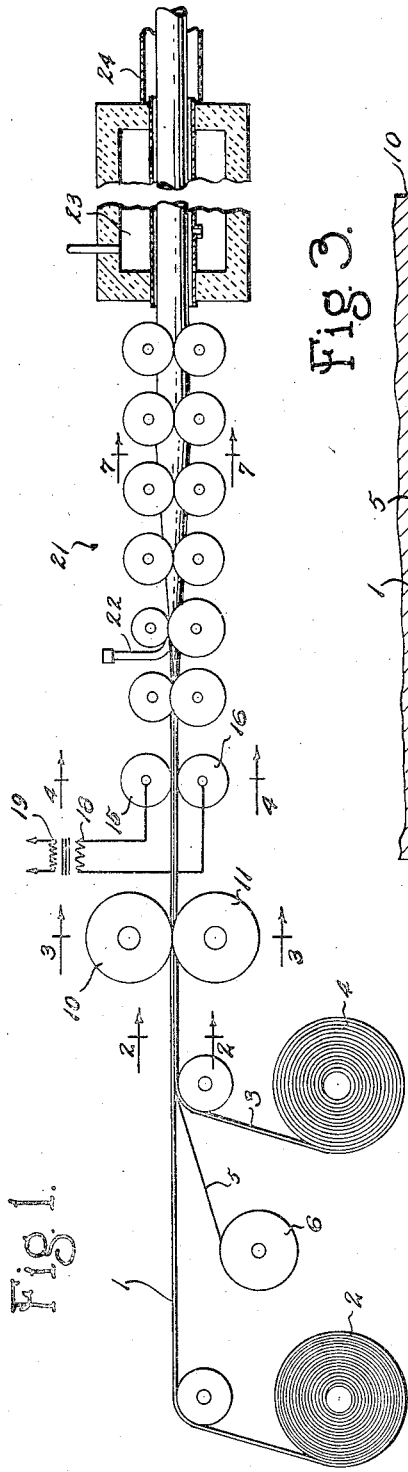
INVENTOR.
Bert L. Quarnstrom
BY Barnes, Kisselle, Laughlin & Raisch
ATTORNEYS

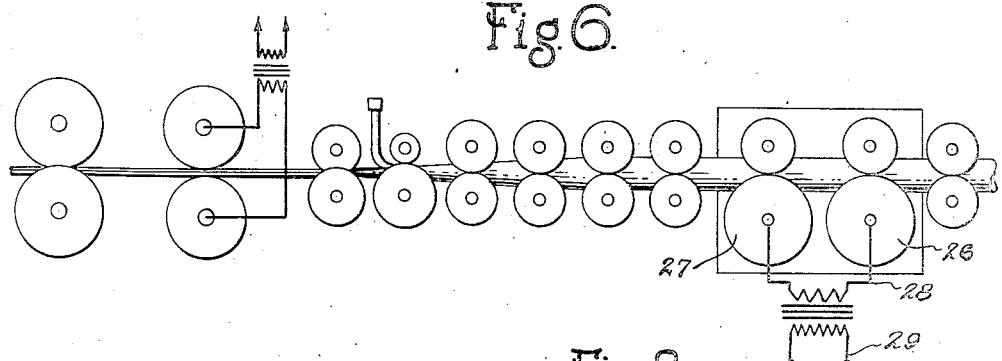
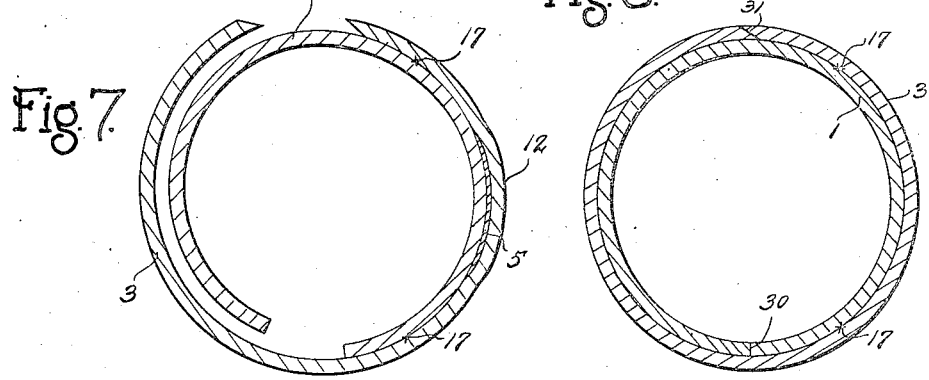
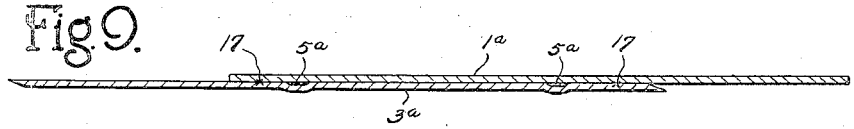
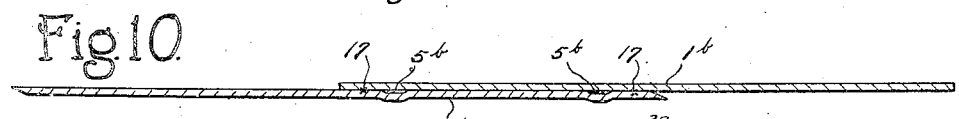
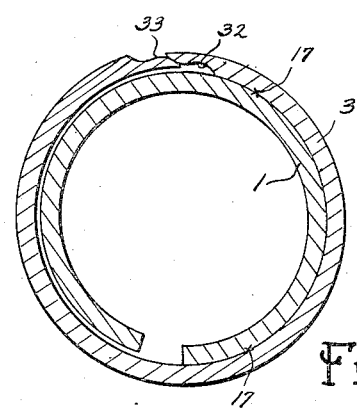
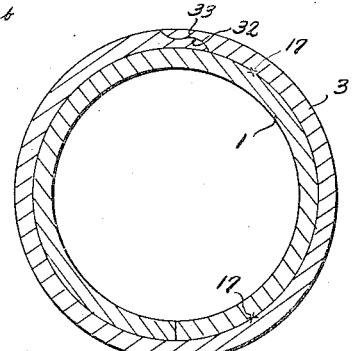
INVENTOR.
Bert L. Quarnstrom
BY Barnes, Kiselle, Laughlin & Raisch
ATTORNEYS Patented Aug. 6, 1940

2,210,338

UNITED STATES PATENT OFFICE 2,210,338

METHOD OF MAKING TUBES

Bert L. Quarnstrom, Detroit, Mich., assignor to Bundy Tubing Company, Detroit, Mich., a corporation of Michigan Application July 30, 1938, Serial No. 222,284

6 Claims. (Cl. 29—188)

This invention relates to the making of multiply tubing fashioned from strip stock. The invention is directed particularly to the making of tubing fashioned from a plurality of strips of stock, as for example, two strips.

Tubing of this type is useful in the automotive field for gas lines, oil lines, hydraulic brake lines and the like, and in heat exchange devices of refrigerators and air conditioning apparatus and other places. Tube for such uses is sealed by a metal which secures the plies together and seals the seams.

This invention is directed particularly to a method of making such a tube where the sealing metal is carried into position by the strip stock from which the tube is fashioned. The sealing metal, however, is not attached to any part of the strip stock in the form of a precoating or the like, but takes the form of separate strip or wire mechanically associated with the strip stock. To this end, where two strips of stock are used, the strips are initially disposed in a partial overlapping relationship, with the supply of sealing metal disposed between the overlapping parts of the stock and the strips are preferably united or tacked in this relationship. Still further, the method of this invention provides for the fashioning of a multi-ply tube from two strips of stock by a single tube mill operation, as the plies are initially partially overlapped and united with each other to provide a composite piece of stock.

The strip stock from which the tube is fashioned may be low carbon steel, or for that matter any other metal, depending upon the desires of the user, such as copper, brass or other cuprous metals or various steel alloys, or the like, while the sealing metal is preferably one which melts at a lower temperature than that of the strip stock. The sealing metal may be a soft solder such as an alloy of lead and tin, or a hard solder or spelter of relatively high melting point such as copper, an alloy containing copper, cuprous metals generally and the like. Where, for example, copper is used as the sealing metal, the strip stock should have a higher melting point, as for example, steel. Where the strip is of copper or cuprous metal, the sealing metal should be of a lower melting point such as a soft solder. The invention is thought to be particularly applicable to tube fashioned from steel stock and sealed by copper or other cuprous metal. The invention and its objects will be more clearly appreciated as the detailed description is followed in connection with the accompanying drawings wherein certain apparatus and method steps are depicted for illustrating the invention.

Fig. 1 is a diagrammatic view of an apparatus for carrying out the method.

Fig. 2 is a cross sectional view taken substantially on line 2—2 of Fig. 1.

Fig. 3 is an enlarged cross sectional view of pressure rollers taken substantially on line 3—3 of Fig. 1.

Fig. 4 is a cross sectional view taken substantially on line 4—4 of Fig. 1 illustrating an arrangement for the preliminary attachment of the strips of stock.

Fig. 5 is a plan view of the composite strip stock and sealing metal from which the tube may be fashioned.

Fig. 6 is a view similar to Fig. 1 showing a modified arrangement.

Fig. 7 is a cross sectional view taken through the tube as it is being formed, and substantially on line 7—7 of Fig. 1.

Fig. 8 is a cross sectional view of a completed tube.

Fig. 9 is a cross sectional view taken through a composite strip illustrating a modified arrangement of strips.

Fig. 10 is a cross sectional view similar to Fig. 9 showing a further modified arrangement of a composite strip.

Fig. 11 is a cross sectional view taken through a tube just prior to its complete formation illustrating a modified seam arrangement.

Fig. 12 is a cross sectional view of the form shown in Fig. 11 illustrating the tube completed.

The illustration in the accompanying drawings is based upon a tube fashioned from two strips of stock. One strip 1, which becomes the inner ply, may be drawn from a supply reel 2, while the other strip 3, which becomes the outer ply, may be drawn from a reel 4. These strips are brought together in partial overlapping relationship as illustrated in Fig. 2. The sealing metal may be in the form of a wire 5 drawn from a spool or reel 6 and disposed between the overlapping portions as illustrated in Fig. 2.

The strips and sealing metal may be drawn with continuous movement, and where the sealing metal is in the form of a wire, pressure may be applied to flatten the wire somewhat. This may be done by pressure rolls 10 and 11 which may be driven by any suitable means. As illustrated in Fig. 3, these pressure rolls flatten out the wire as illustrated. An advantageous and preferable arrangement, is that of slightly deforming the strip 3 which forms the outer ply to accommodate the wire, this deformation taking the shape of an outward bulge 12, although the illustration in Fig. 3 is somewhat exaggerated. The purpose of this will presently appear.

The next step is a preliminary attachment of the plies, and this may be done by a spot welding arrangement illustrated by the opposed welding rolls 15 and 16. The locations of the spot welding are preferably spaced apart, as illustrated in Fig. 5, the individual spots being indicated at 17 and there preferably being a row of spots on each side of the supply of sealing metal. Where alternating current is used for this purpose, the electrodes may be connected to a secondary 18 of a transformer, the primary line being shown at 19. The alternations of the current in relation to the speed of the strip may be such that the spaced spot welds are effected, but if this relationship is such that the spot welds are not spaced far enough apart, a circuit breaker 20 may be located in the primary. Direct current may also be used for the welding operation, in which case an interrupter may be used in the circuit to effect the spacing of the spots.

Following this preliminary attachment, the composite strip is passed through a tube forming mill having a plurality of forming rollers generally illustrated at 21. An arbor may be disposed within the tube around which the stock is fashioned, and the arbor may be supported by a supporting device 22. Tube mills of this nature are well known to those versed in the art and need not be further described.

After the tube is formed it is subjected to heat to melt the sealing metal so that the same flows throughout the circumferential extent of the tube between the plies to unite the plies and the seams at the edges of the strip. The melted sealing metal flows between the spot welds. The tube may pass directly into a furnace 23, as illustrated in Fig. 1, for this purpose. As the tube comes out of the furnace, it may be passed through a suitable cooler 24. It is to be understood, of course, that the metal stock may be suitably cleaned so that the sealing metal will properly adhere to or unite therewith, and a suitable flux or non-oxidizing or reducing atmosphere may be used. For example, where a copper or cuprous sealing metal is used with steel strip stock, the furnace may be supplied with an atmosphere of hydrogen or other reducing or non-oxidizing gas.

As illustrated in Fig. 1, the tube moves directly from the tube mill into the furnace. It is within the invention to sever the tube into lengths as it passes from the tube mill, and then to pass the severed lengths through a furnace at a later time.

In Fig. 6 there is shown a modified arrangement wherein the furnace 23 is displaced and the tube is heated by electrical resistance. Electrode rollers are illustrated at 26 and 27 connected to a secondary 28 of a transformer where alternating current is used, the primary being illustrated at 29.

The shape of the tube just prior to its final formation may appear substantially as illustrated in Fig. 7, and it will be readily understood how the composite strip may be fashioned in this manner by the rollers of the tube mill. At this time the strip of sealing metal 5 is still in place, and the exterior ply may be slightly bulged as shown in an exaggerated manner. Obviously, the inner strip should be of a slightly less width than the outer strip, since it is fashioned on a smaller radius, and due to the fact that the overlapping portions of the composite strip are fixedly united at the spots 17, a problem is presented because the portion of the inner ply between the two rows of spot welds is bent on a smaller radius than the portion of the outer ply between the rows of spot welds. Therefore, when the tube is in the shape shown in Fig. 7, there is a considerable tension on the metal of the outer ply between the rows of spot welds, and compression of the metal of the inner ply. The formation of this part of the outer ply with the bulge to accommodate the sealing metal, is designed to take care of this differential in the condition of these portions of the inner and outer plies. When the sealing strip is melted, this condition is relieved and the tension on the outer ply causes the bulge to flatten out, so to speak, and to take substantially a shape of an arc on a radius around the center of the tube, while the adjacent portion of the inner ply may expand somewhat. The result is that the space occupied by the solid sealing metal is substantially closed when the sealing metal melts. The result is that the sealing metal spreads out and flows in between the plies and between the abutting edges of the plies. Thus the plies are sealed.

The abutting edges of the inner ply may be, and are preferably, in direct abutment, forming a butt seam 30 while the edges of the outer ply may be initially beveled, forming a seam 31. This beveling of the edges of the outer plies permits of an overlap of the edges of the outer ply to a greater or lesser extent to accommodate for differentials in the width of the two strips of stock and differentials in the thickness of the stock, as set forth in my application Serial No. 193,143, filed February 28, 1938.

A modified arrangement is shown in Fig. 9 wherein the plies are overlapped for a considerable distance. The inner ply is illustrated at 1a and the outer ply at 3a, and in this case two strips of sealing metal 5a may be used. However, the strips may be overlapped as illustrated in Fig. 9 with only one strip of sealing metal used. In Fig. 10 the strips 1b and 3b are overlapped to an extent less than that shown in Fig. 9, and two sealing strips 5b used.

In the arrangement shown in Figs. 9 and 10 it will be noted that the spot welds 17 are located in close proximity to one edge of each strip. This is particularly important as regards the overlapping edge of the outer strip. When the underlapping edge of the outer strip is placed underneath the overlapping edge, as illustrated in Fig. 8, said overlapping edge is held tightly against the inner ply by reason of the close proximity of the row of spot welds. This overcomes any tendency of the plies to spread apart, and particularly the tendency of the underlapped edge to spread open. Thus the plies are held in proper relationship and ready to be united by the sealing metal.

A still different arrangement is illustrated in Figs. 11 and 12 wherein the overlapping edge of the outer ply is fashioned with an undercut formation 32 while the underlapping edge has a co-operating shape with a bead formation 33. When these edges are interfitted, as shown in Fig. 12, there is a locking action which holds the edges together, pending final sealing by the molten sealing metal. It is advantageous in this form to have one row of welded spots located in close proximity to the overlapping edge of the outer ply as illustrated.

With this arrangement it will be observed that the seams of the individual plies are circumferentially removed from each other. Where the plies are overlapped to an extent about as shown in Figs. 2, 3 and 4, the seams will be substantially diametrically opposite each other in the finished tube. This will also be the case where the strips are overlapped about as shown in Fig. 10. Where there is a greater overlap, however, as shown in Fig. 9, the seams will not be spaced from each other to such a great extent, although they will be sufficiently far removed from each other circumferentially to provide adequate strength in the tube. While the tubes illustrated herein show the outer ply with beveled edges and the inner ply with perpendicular edges, it will, of course, be understood that it is within the invention to vary this arrangement of the edges. For instance, the edges of both strips may be perpendicular, or both may be beveled, or other arrangements may be used.

I claim:

1. The method of making tube from two strips of stock which comprises, moving two strips longitudinally and disposing them in partial overlapping relationship, feeding a structurally separate strip of sealing metal into position between the overlapping portions of the strips, fastening the strips securely together in such overlapping relationship with the sealing metal held therebetween, fashioning the composite strip into hollow cross sectional form with one strip forming an inner ply and the other strip forming an outer ply, with the edges of the strips disposed in seam-forming relationship and with the seams circumferentially spaced with respect to each other, and then heating the hollow cross sectional form to melt the sealing metal to unit the plies and seams.

2. The method of making tube from two strips of stock which comprises, moving two strips of stock longitudinally and disposing the strips in partial overlapping relationship, feeding a structurally separate strip of sealing metal in between the overlapping parts of the strips, initially uniting the strips by spaced spot welds with a row of spot welds on each side of the sealing metal whereby to hold the sealing metal positioned, fashioning the composite strip into hollow cross sectional form with one strip forming an inner ply and one strip forming an outer ply, with the edges of the strips disposed in seam-forming relationship and with the seams spaced circumferentially with respect to each other, and then heating the hollow cross sectional form to melt the sealing metal and cause the same to flow between the spot welds and between the plies and seams for uniting the same.

3. The method of making tube having a double ply wall from two strips of stock which comprises, disposing two strips in partial overlapping relationship, placing a wire of sealing metal between the overlapping parts, weld-uniting the overlapping parts at spaced points and on opposite sides of the sealing strip, subjecting the overlapping parts to pressure to flatten the sealing wire and to form a bulge in the strip which is to become the outer ply, fashioning the composite strip into hollow cross sectional form with the edges of the strips disposed in seam-forming relationship and with the seams spaced circumferentially of each other, and then subjecting the hollow cross sectional form to heat to melt the sealing metal so that the same flows between the plies and seams to unite the same, the tension in the outer ply between the weld connections serving to flatten out the bulge as the sealing metal melts to substantially close the space between these portions of the plies.

4. The method of making tube having a double ply wall from two strips of stock which comprises, disposing two strips in partial overlapping relationship, placing a wire of sealing metal between the overlapping parts, weld-uniting the overlapping parts at spaced points and on opposite sides of the sealing strip, subjecting the overlapping parts to pressure to flatten the sealing wire and to form a bulge in the strip which is to become the outer ply, fashioning the composite strip into hollow cross sectional form with the edges of the strips disposed in seam-forming relationship and with the seams spaced circumferentially of each other, and then subjecting the hollow cross sectional form to heat to melt the sealing metal so that the same flows between the plies and seams to unite the same, the tension in the outer ply between the weld connections serving to flatten out the bulge as the sealing metal melts to substantially close the space between these portions of the plies, all with substantially continuous longitudinal movement of the strips, the sealing metal and hollow cross sectional form.

5. The method of making tube from two strips of stock which comprises moving the strips longitudinally and disposing them in partially overlapping relationship, feeding a structurally separate wire of sealing metal in between the overlapping parts, subjecting the overlapping parts to pressure to flatten the wire, fixedly securing the overlapping parts together with the sealing wire therebetween, fashioning the composite strip into hollow cross sectional form with one strip forming an inner ply and one strip forming an outer ply and with the edges of the strips disposed in seam-forming relationship and with the seams spaced circumferentially from each other, and then heating the hollow cross sectional form to melt the sealing metal to unite the plies and seams.

6. The method of making multi-ply tube from two strips of stock which comprises, disposing two strips in partial overlapping relationship, placing a strip of sealing metal between the overlapping parts, welding the overlapping parts together by a row of spaced weld connections on opposite sides of the sealing metal, providing metal in the part of one of the strips between the rows of weld connections in excess of the corresponding metal in the other strip, fashioning the composite strip into hollow cross sectional form, with the strip having the excess of metal forming the outer ply, and then heating the hollow cross sectional form to melt the sealing metal to unite the plies, said excess of metal providing for the fashioning of said portion of the outer ply on a radius larger than that of the inner ply, and the tension therein causing the plies to come substantially together at the location between the rows of weld connections.

BERT L. QUARNSTROM.